(12) United States Patent
Takanami

(10) Patent No.: US 8,821,101 B2
(45) Date of Patent: Sep. 2, 2014

(54) AUTOMATIC PALLET EXCHANGE DEVICE

(75) Inventor: Yasuo Takanami, Yamanashi (JP)

(73) Assignee: Panasonic Corporation, Osaka (JP)

( * ) Notice: Subject to any disclaimer, the term of this patent is extended or adjusted under 35 U.S.C. 154(b) by 848 days.

(21) Appl. No.: 12/649,830

(22) Filed: Dec. 30, 2009

(65) Prior Publication Data
US 2010/0172736 A1  Jul. 8, 2010

(30) Foreign Application Priority Data

Jan. 5, 2009  (JP) .................................. 2009-000073

(51) Int. Cl.
*B65G 1/10* (2006.01)
*B23Q 7/14* (2006.01)

(52) U.S. Cl.
CPC .................................. *B23Q 7/1431* (2013.01)
USPC .................................. 414/331.18; 414/416.08

(58) Field of Classification Search
CPC .................................. B65G 1/10; B23Q 7/1431
USPC ............ 414/222.04–222.06, 226.04, 331.14, 414/331.18, 217, 416.03, 416.08, 283; 408/62
See application file for complete search history.

(56) References Cited

U.S. PATENT DOCUMENTS

| | | | | |
|---|---|---|---|---|
| 6,682,288 B2 * | 1/2004 | Klein et al. | | 414/217 |
| 7,039,499 B1 * | 5/2006 | Nasr et al. | | 700/245 |
| 2003/0091410 A1 * | 5/2003 | Larson et al. | | 414/217 |
| 2006/0072986 A1 * | 4/2006 | Perlov et al. | | 414/217 |
| 2008/0069672 A1 * | 3/2008 | Ikehata | | 414/283 |

FOREIGN PATENT DOCUMENTS

| | | |
|---|---|---|
| JP | 61-076257 A | 4/1986 |
| JP | 3-36134 U | 4/1991 |
| JP | 03-178754 A | 8/1991 |
| JP | 04-196148 A | 7/1992 |
| JP | 04-348835 A | 12/1992 |
| JP | 07-186079 A | 7/1995 |
| JP | 2006-190816 A | 7/2006 |
| JP | 2006-351879 A | 12/2006 |

* cited by examiner

*Primary Examiner* — Jonathan Snelting
(74) *Attorney, Agent, or Firm* — Pearne & Gordon LLP

(57) ABSTRACT

An automatic pallet exchange device includes: a pallet magazine 1 that accommodates a plurality of pallets 3 respectively having a plurality of horizontally extending protrusions 16 so as to be taken in and out in horizontal directions; a pallet fixing part 23 that allows the plurality of protrusions 16 to be engaged with a plurality of depression parts 17 to horizontally fix the pallet 3 and a pallet fixing table 20 on which the pallet fixing part 23 is arranged. The pallet 3 horizontally fixed by the pallet fixing part 23 is horizontally turned and horizontally moved to exchange the pallets 3 between the pallet fixing table 20 and the pallet magazine 1.

4 Claims, 20 Drawing Sheets

AUTOMATIC PALLET EXCHANGE DEVICE

BACKGROUND OF THE INVENTION

1. Field of the Invention

The present invention relates to a device for automatically exchanging a pallet that supplies a die used in a die-bonding device.

2. Description of the Related Art

A die-bonding device carries out a bonding operation for mounting a die peeled off from a wafer sheet on a board by a thermal compression and bonding. Since the wafer sheet is rich in its flexibility and inconveniently hardly treated as it is, in the bonding device, the wafer sheet is handled under a state that the wafer sheet is mounted on an annular rigid member called a pallet. In patent literature 1, an example is disclosed in which a pallet is used in a bonding device. Herein, a plurality of pallets are previously accommodated in a pallet accommodation magazine so as to completely use a die of the pallet in use at present or replace the pallet by another pallet which is accommodated in the magazine when a different kind of die is desired to be bonded.

Patent literature 1: JP-A-4-196148

The device disclosed in the patent literature 1 includes a linearly moving arm as a mechanism for exchanging the pallet to linearly move the arm engaged with the pallet and thus move the pallet. However, when the pallet is exchanged only by linear movement of the arm, since the moving speed of the arm is the moving speed of the pallet, it is limited to shorten an exchanging time due to the restriction of a linearly moving mechanism. Further, a problem arises that when the linearly moving mechanism is provided which is not used for other purpose than an exchange and a space for the movement of the linearly moving arm is ensured, an entire part of the device is enlarged to cause a high cost.

SUMMARY OF THE INVENTION

It is an object of the present invention to provide an automatic pallet exchange device that realizes the compactness and a shortening of an exchanging time.

A first aspect of the invention provides with an automatic pallet exchange device including: a pallet magazine that accommodates a plurality of pallets respectively having a plurality of horizontally extending protrusions so as to be taken in and out in horizontal directions; a pallet fixing part that allows the plurality of protrusions to be engaged with a plurality of depression parts to horizontally fix the pallet; a pallet fixing table on which the pallet fixing part is arranged; a unit that horizontally moves the pallet fixing table; and a unit that horizontally turns the pallet fixing part. The pallet that is horizontally fixed by the pallet fixing part is horizontally turned and horizontally moved to exchange the pallets between the pallet fixing table and the pallet magazine.

A second aspect of the invention provides with an automatic pallet exchange device in which the protrusion has a conical body part whose diameter is gradually reduced toward an end and the depression part has an inner peripheral surface of the same configuration as that of an outer peripheral surface of the conical body part, the outer peripheral surface is allowed to come into close contact with the inner peripheral surface to fix the pallet.

A third aspect of the invention provides with an automatic pallet exchange device in which the pallet is horizontally turned and horizontally moved between the pallet fixing table and the pallet magazine at the same time.

A fourth aspect of the invention provides with a pallet used in the automatic pallet exchange device defined in the first aspect of the invention, the pallet including a plurality of horizontally extending protrusions, wherein the protrusion has a conical body part whose diameter is gradually reduced toward an end.

According to the present invention, when the pallet is exchanged, a horizontally moving operation is carried out as well as a linearly moving operation, so that a linear movement distance of the pallet can be more shortened and an entire part of the device can be more simplified and compact than a usual device. Further, since the pallet can be linearly moved and turned at the same time, a time necessary for exchanging the pallets can be shortened.

Further, the pallet has the plurality of protrusions and the protrusions are respectively allowed to be engaged with the depression parts of the pallet fixing part so that the pallet is fixed at a plurality of positions. Thus, accuracy or a reproducibility of positioning is excellent.

Further, the outer peripheral surface of the conical body part of the protrusion is allowed to come into close contact with the inner peripheral surface of the depression part to fix the pallet. Thus, even when an inertial force or a centrifugal force is exerted on the pallet during the movement or a turning operation of the pallet, the position of the pallet is not shifted and strongly maintained.

DESCRIPTION OF THE PREFERRED EMBODIMENTS

Figure 1:
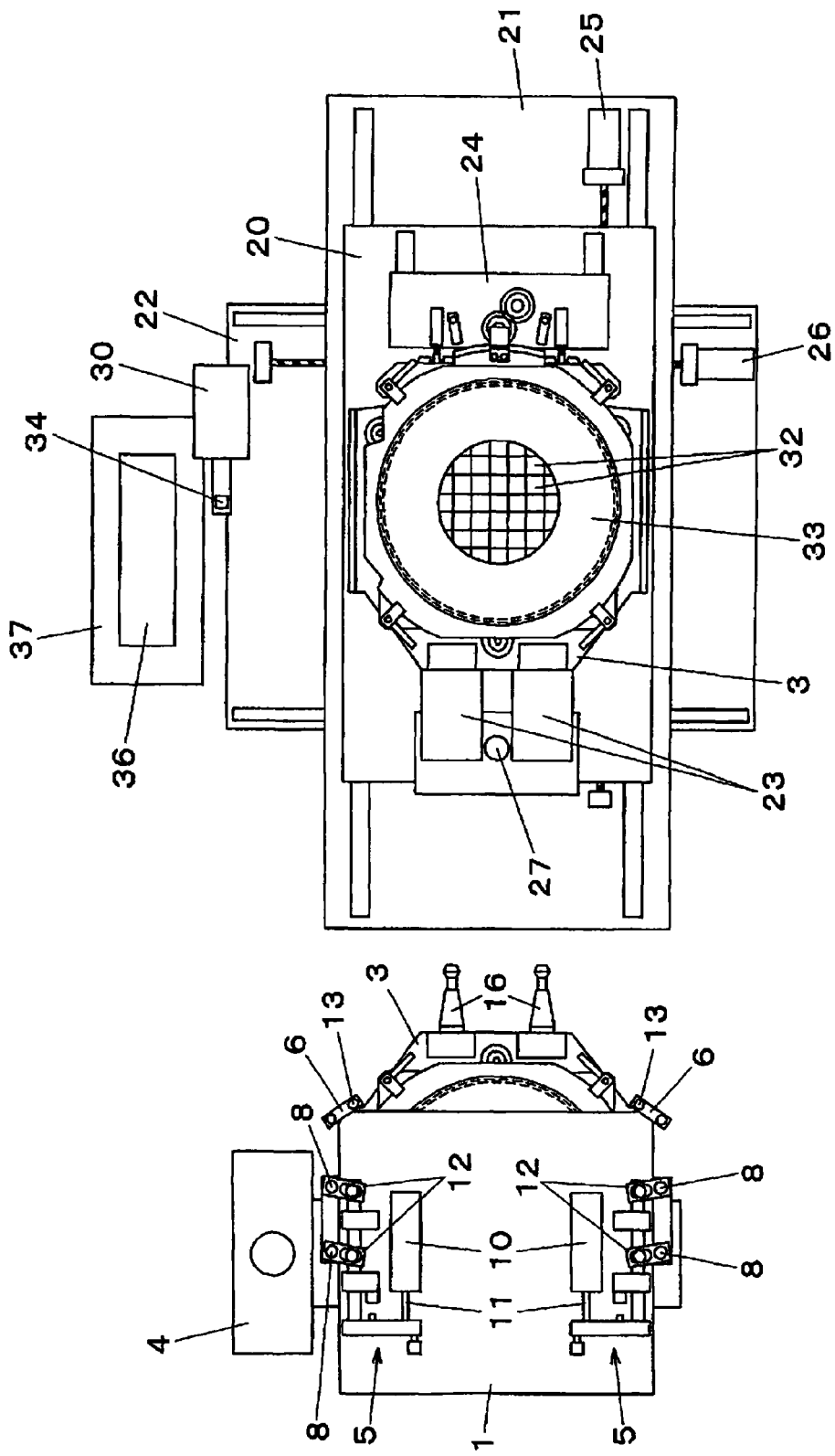
FIG. 1 is a plan view of an automatic pallet exchange device of an exemplary embodiment of the present invention.
Figure 2:
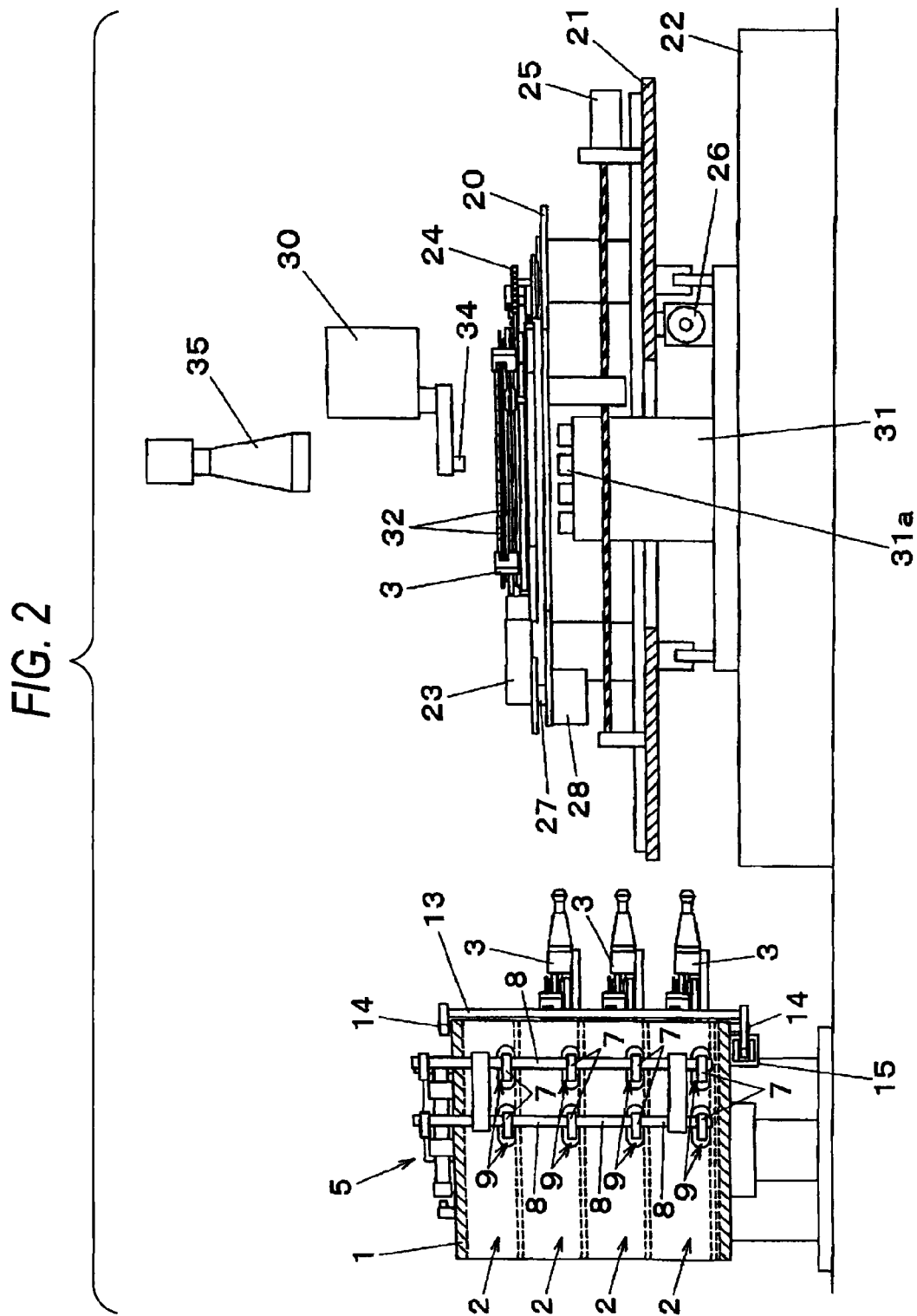
FIG. 2 is a side view of the automatic pallet exchange device of the exemplary embodiment of the present invention.
Figure 3:
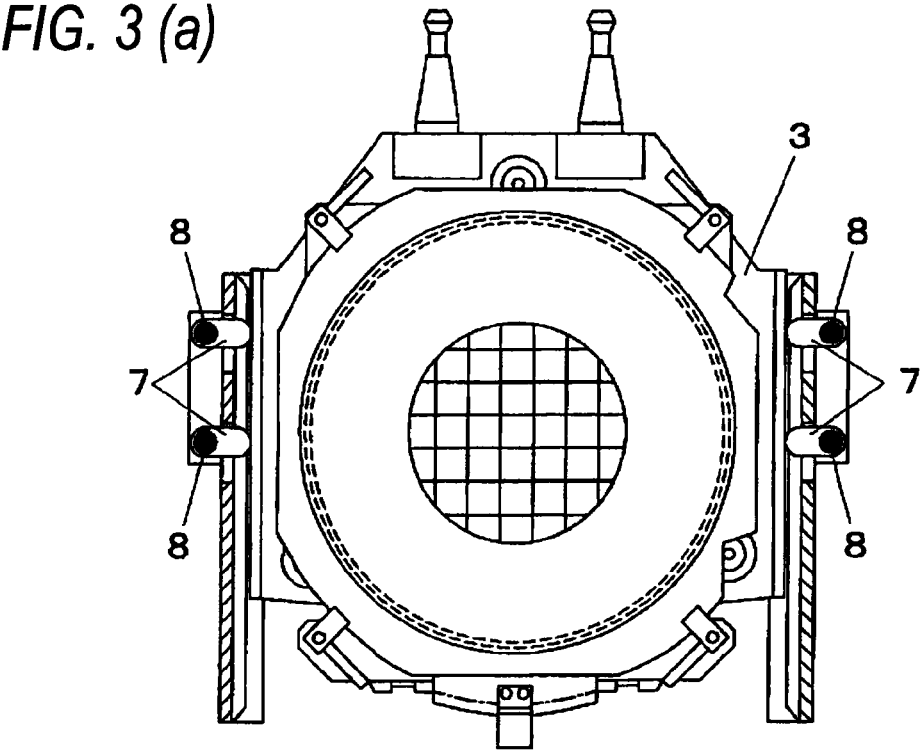
FIG. 3 is an explanatory view of a pallet positioning mechanism.
Figure 3:
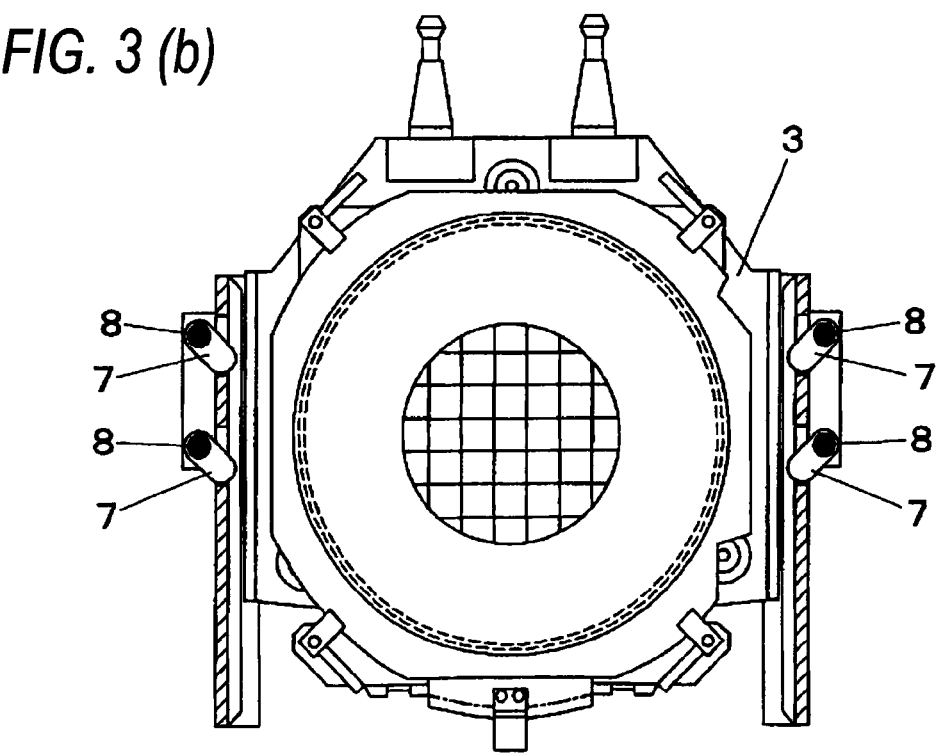
Figure 4:
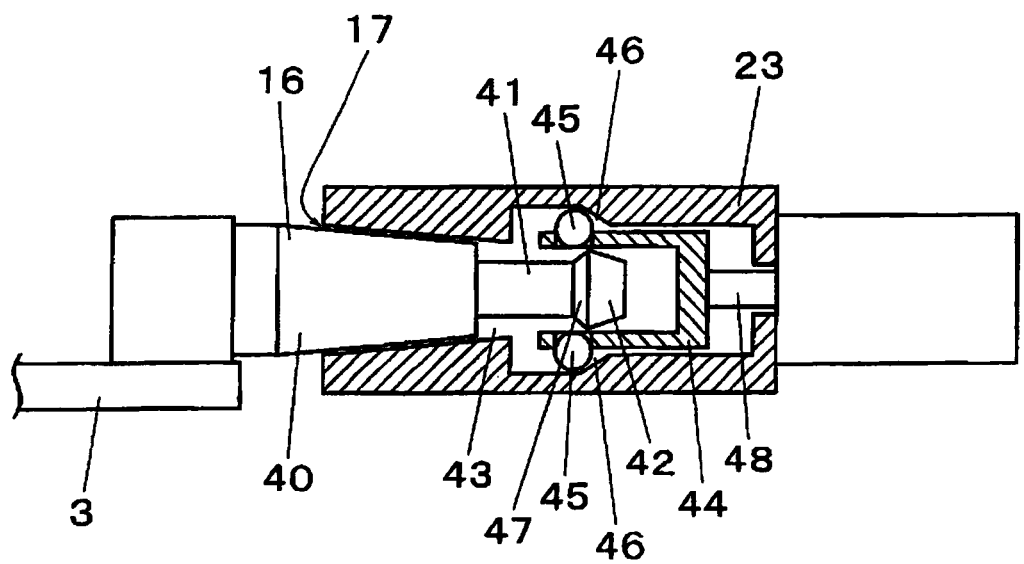
FIG. 4 is an explanatory view of a mechanism for fixing a pallet by a first pallet fixing part.
Figure 4:
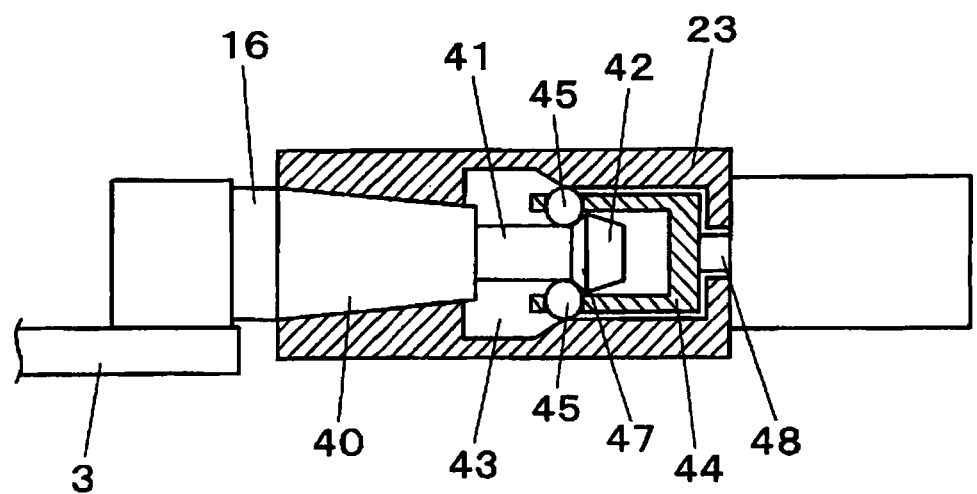
Figure 5:
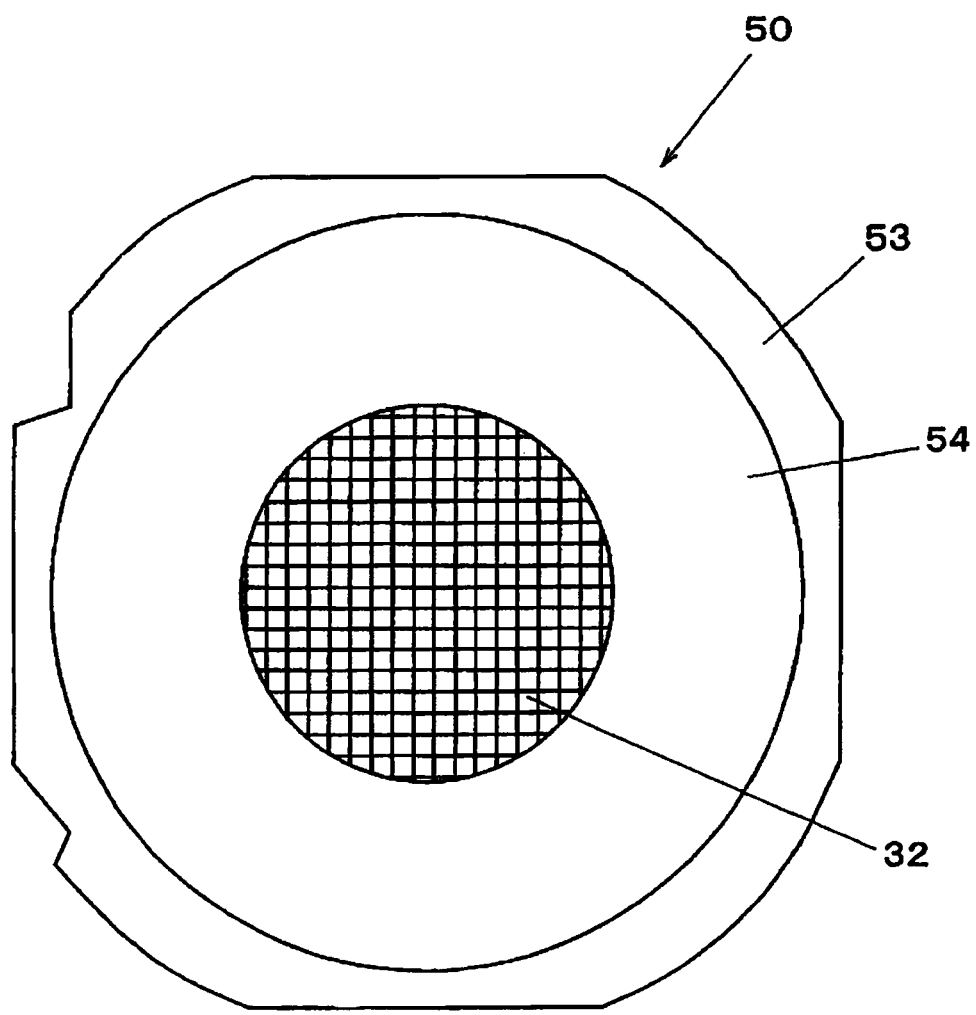
FIG. 5 is a plan view of a wafer ring.
Figure 6:
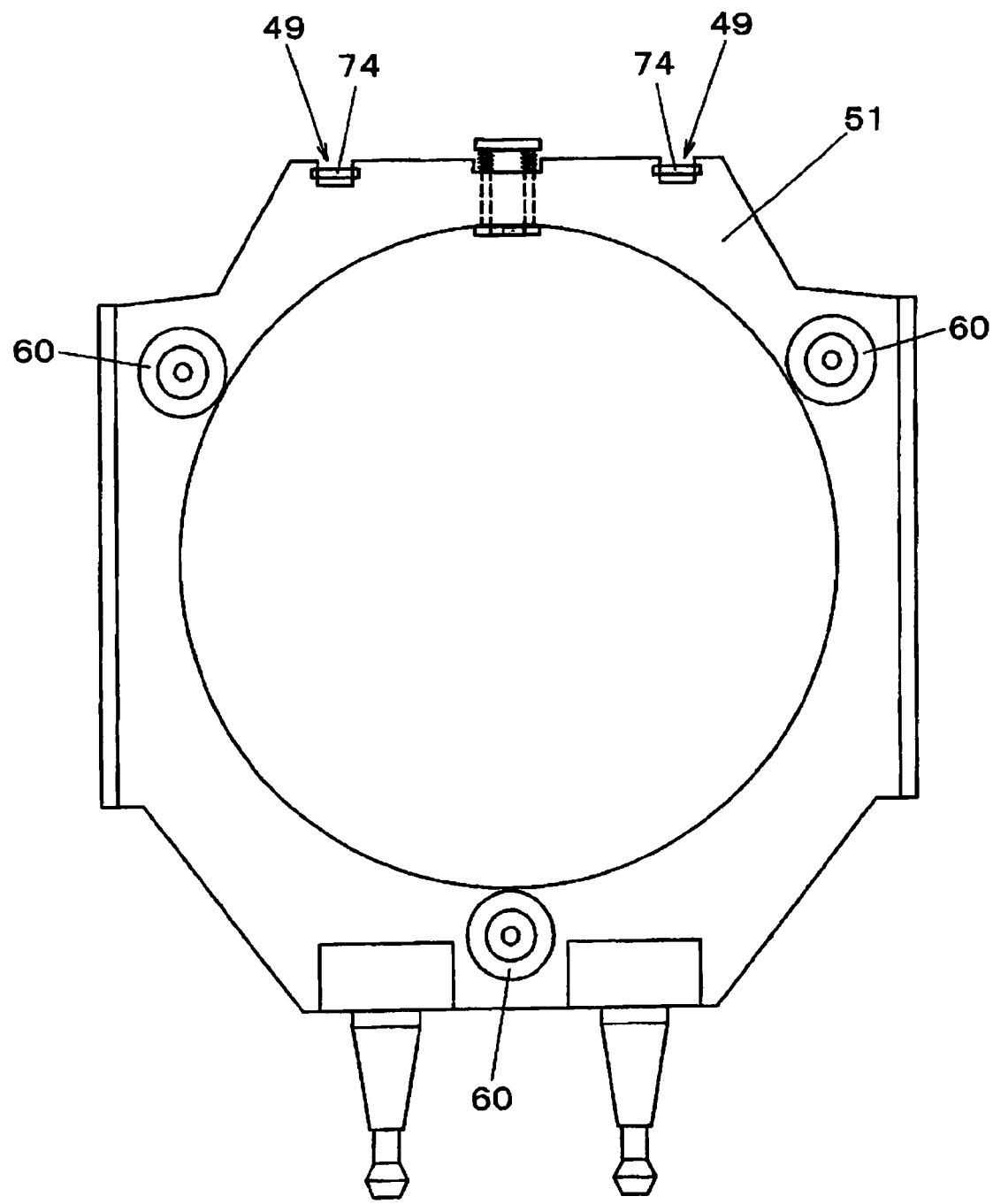
FIG. 6 is a plan view of a pallet rotating part.
Figure 7:
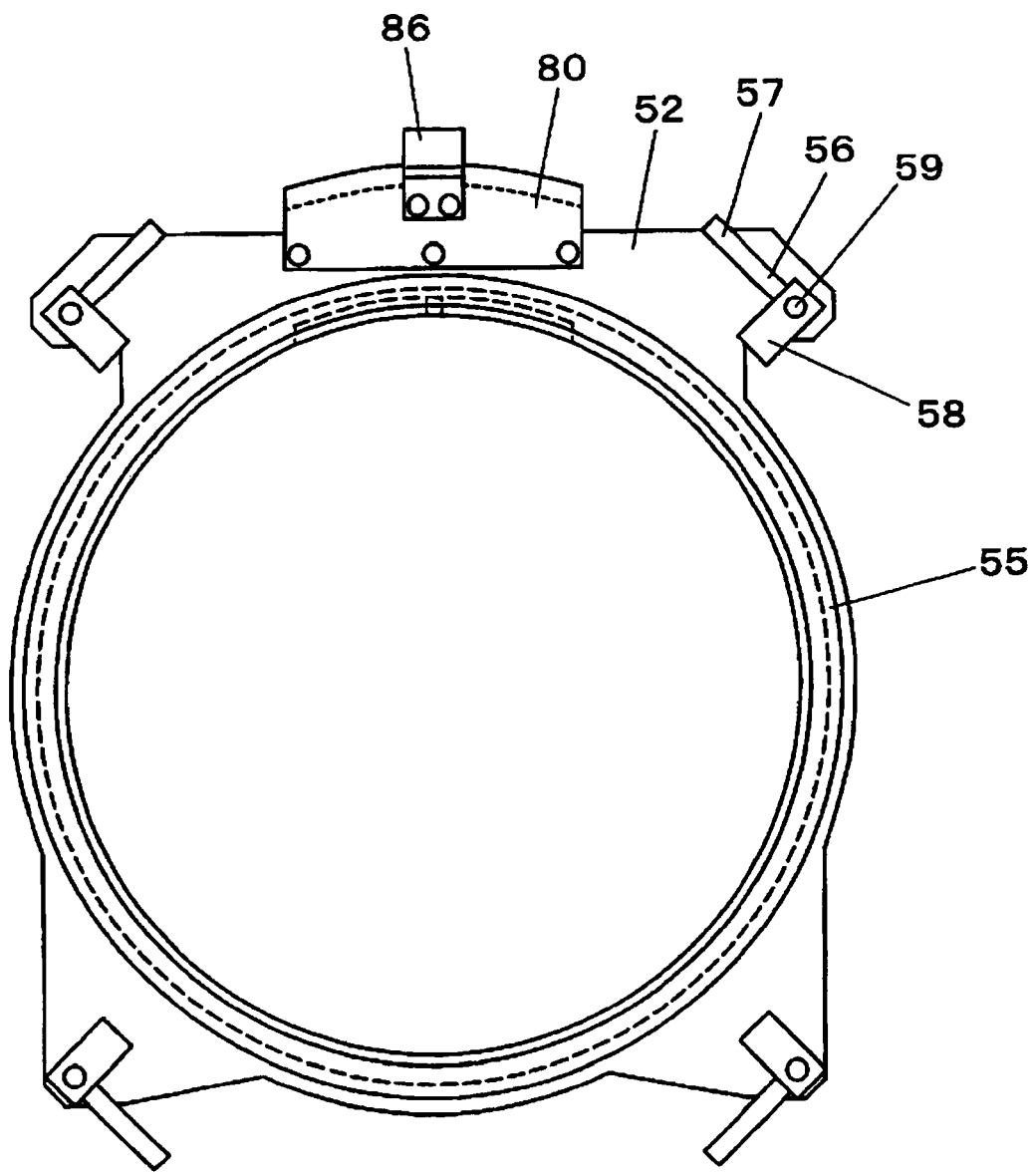
FIG. 7 is a plan view of a pallet base part.
Figure 8:
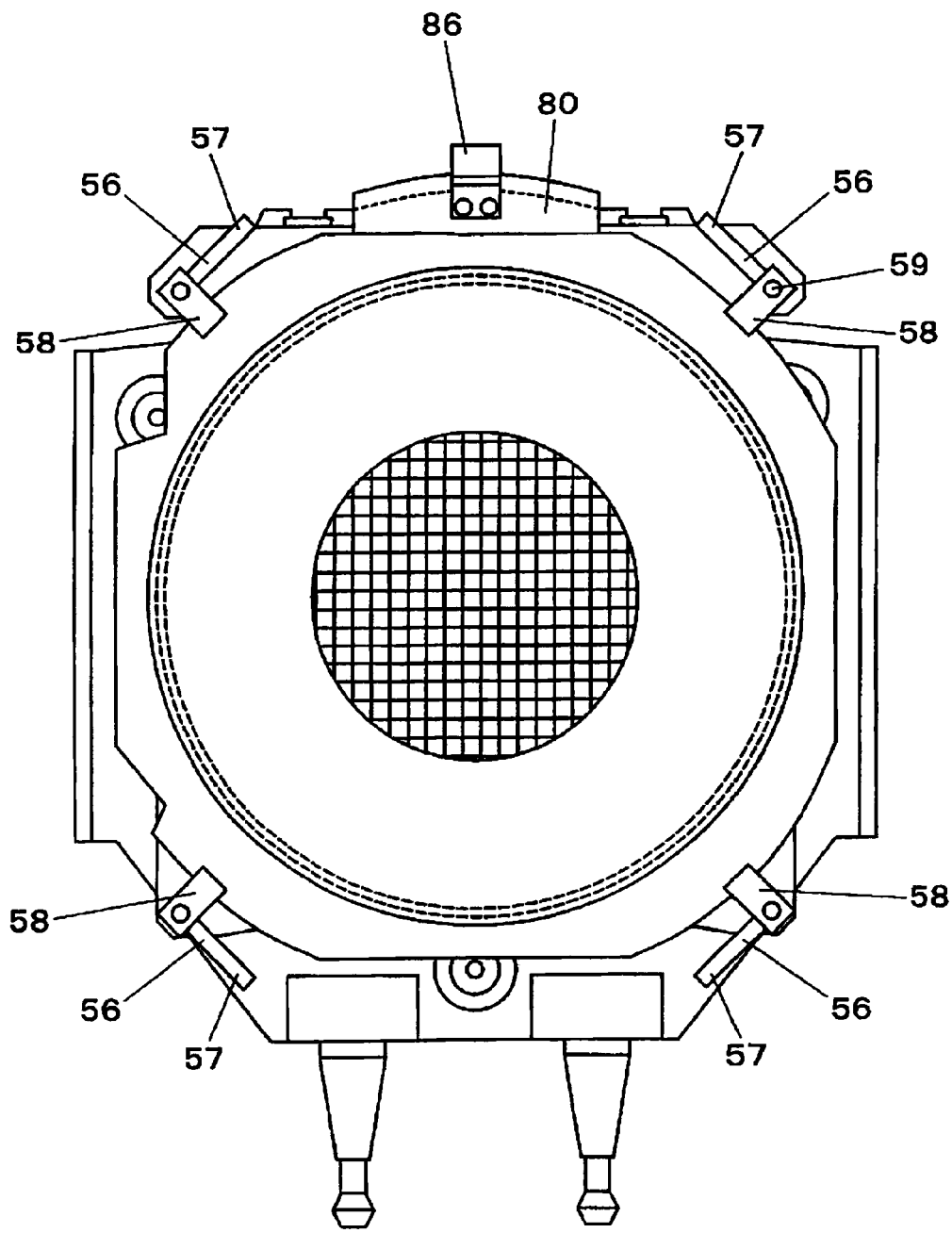
FIG. 8 is a plan view of an entire part of the pallet.
Figure 9:
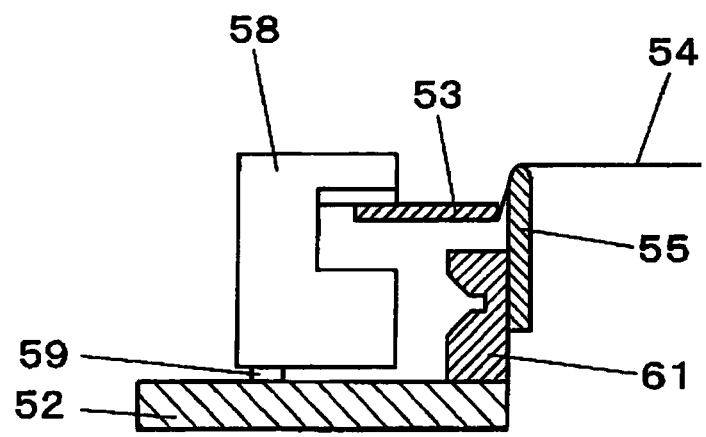
FIG. 9 is an explanatory view of a mechanism for attaching the wafer ring to the pallet rotating part.
Figure 10:
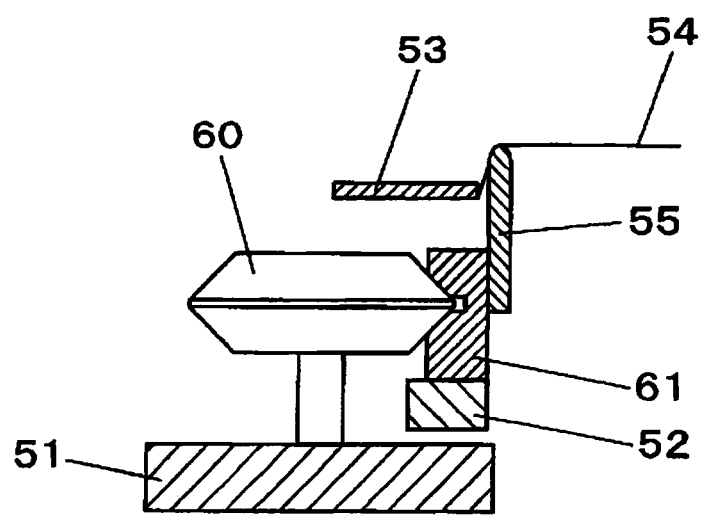
FIG. 10 is an explanatory view of a mechanism for attaching the pallet rotating part to the pallet base part.
Figure 11:
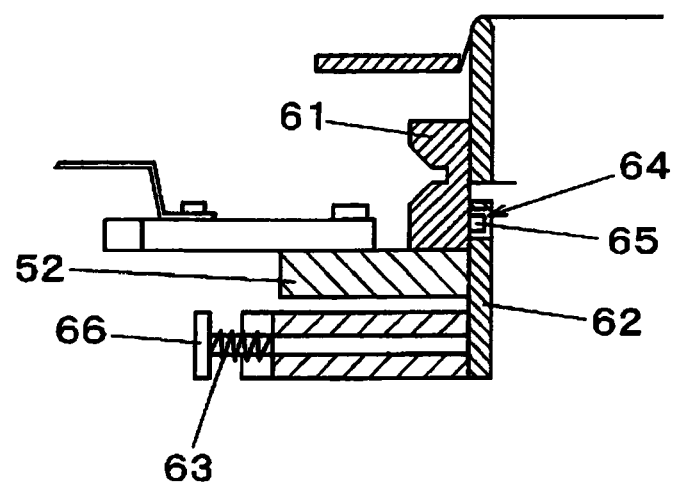
FIG. 11 is an explanatory view of a mechanism for regulating the rotation of the pallet rotating part.
Figure 11:
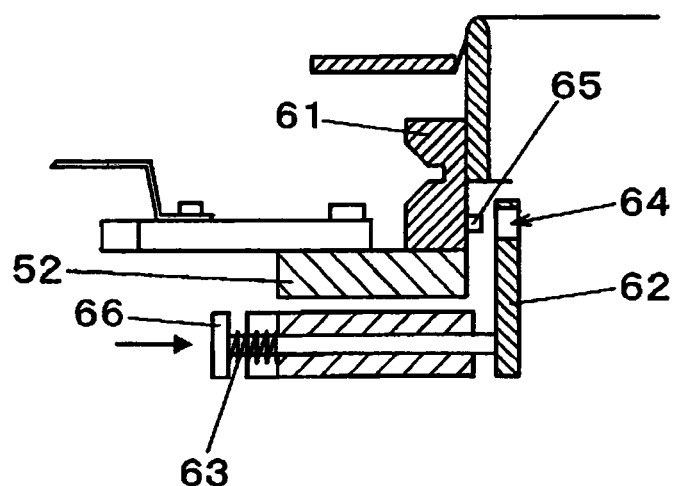
Figure 12:
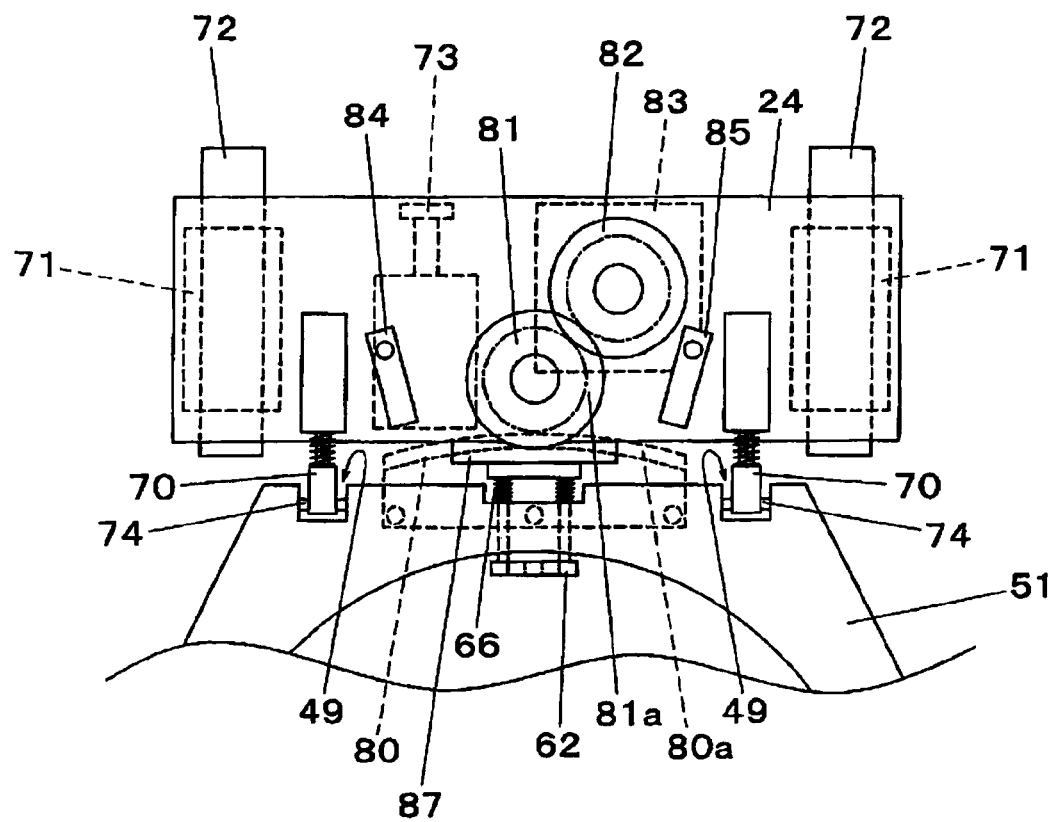
FIG. 12 is an explanatory view of a mechanism for fixing the pallet by a second pallet fixing part.
Figure 13:
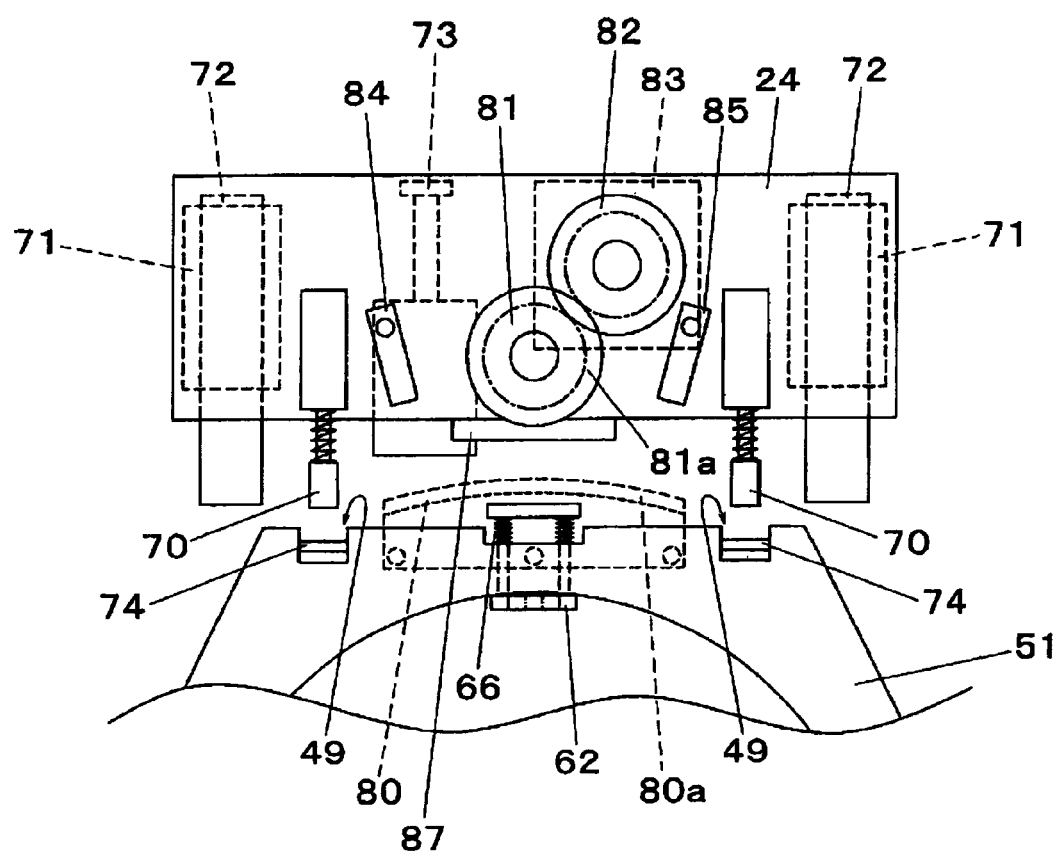
FIG. 13 is an explanatory view of a mechanism for fixing the pallet by the second pallet fixing part.
Figure 14:
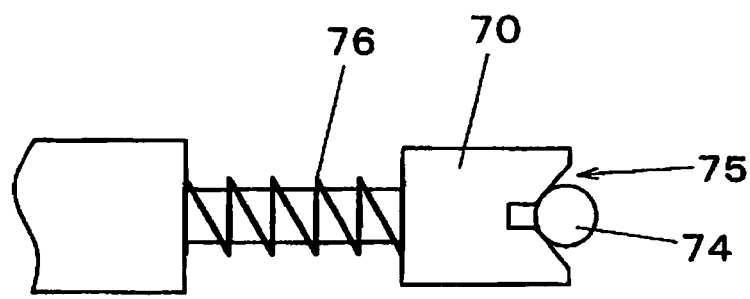
FIG. 14 is an explanatory view of a mechanism for fixing the pallet by the second pallet fixing part.
Figure 14:
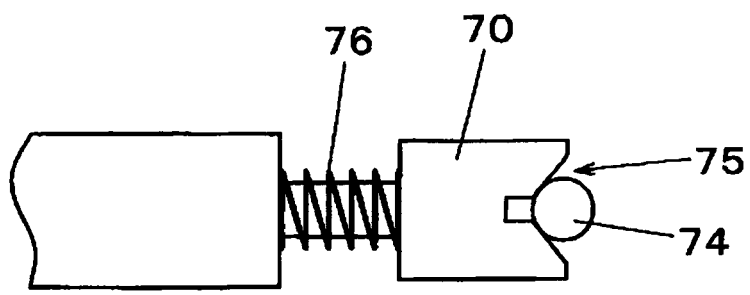
Figure 15:
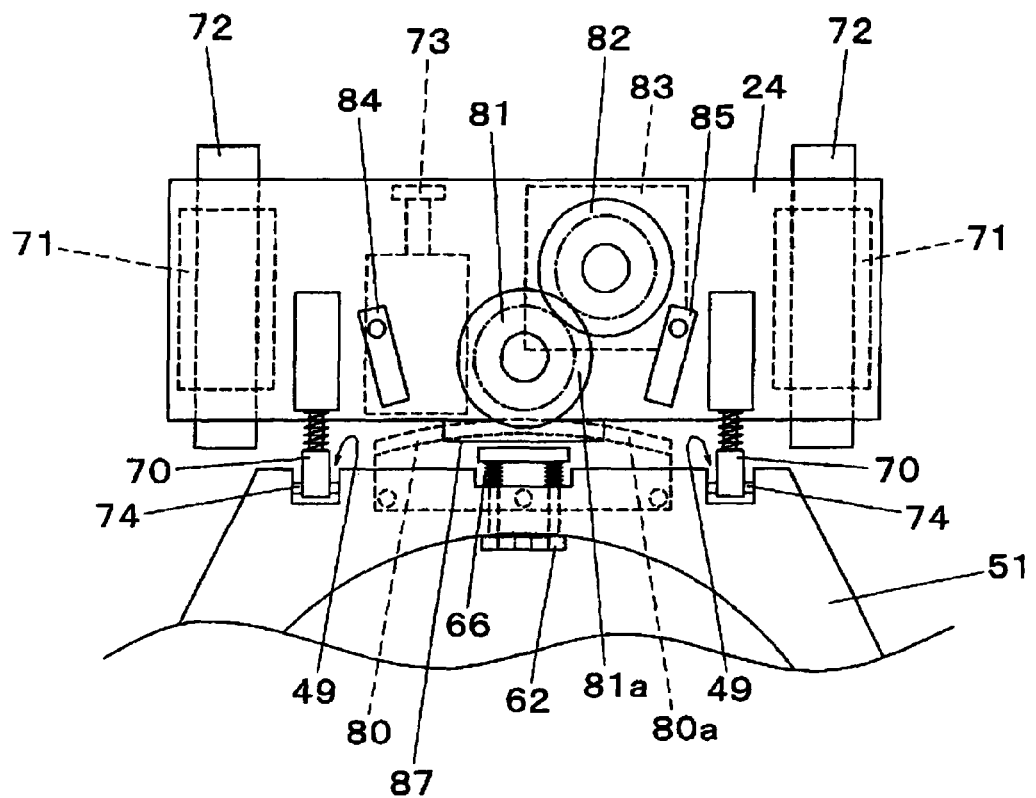
FIG. 15 is an explanatory view of a mechanism for fixing the pallet by the second pallet fixing part.
Figure 16:
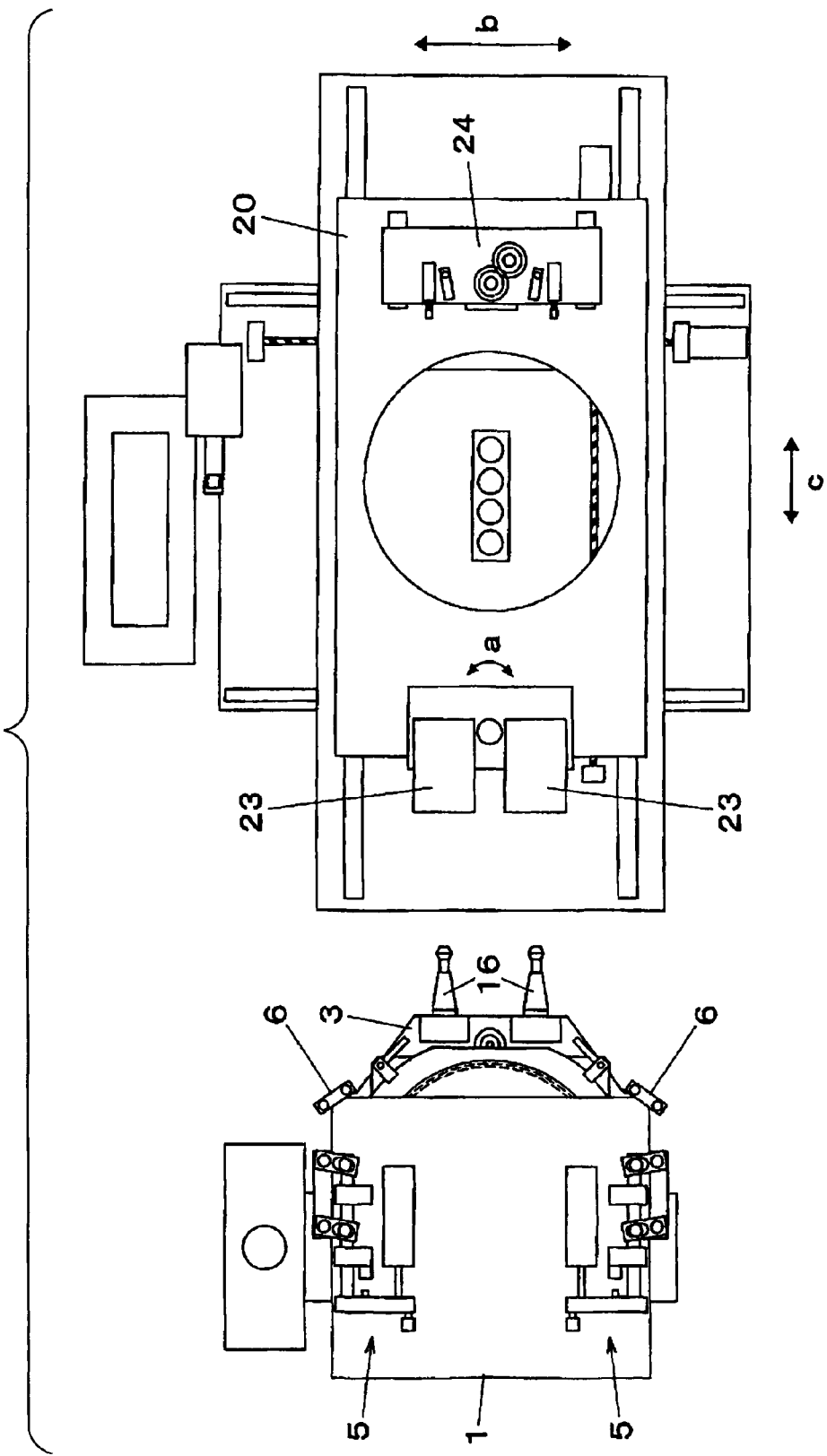
FIG. 16 is an explanatory view of an automatic exchange process of the pallet.
Figure 17:
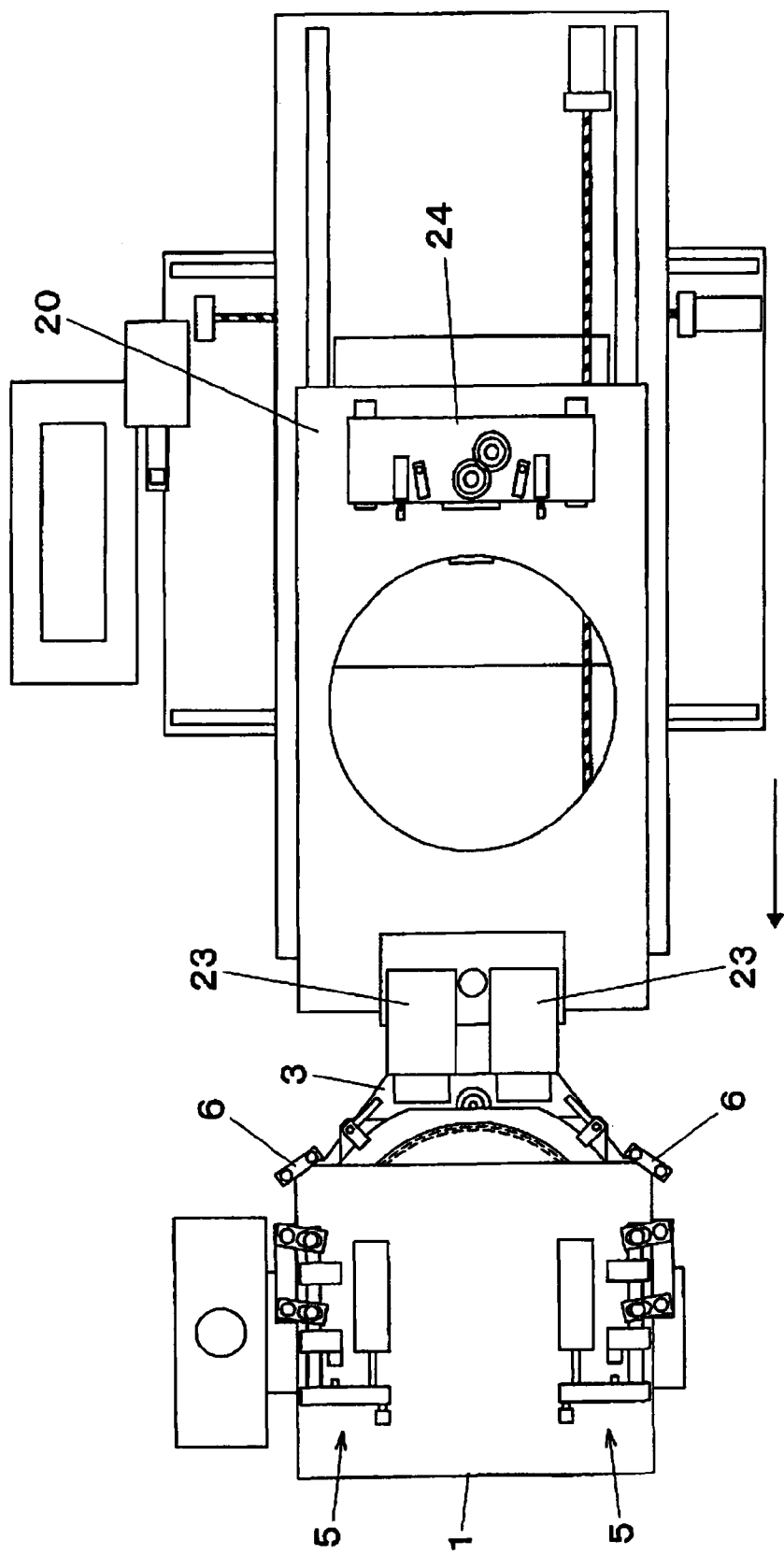
FIG. 17 is an explanatory view of an automatic exchange process of the pallet.
Figure 18:
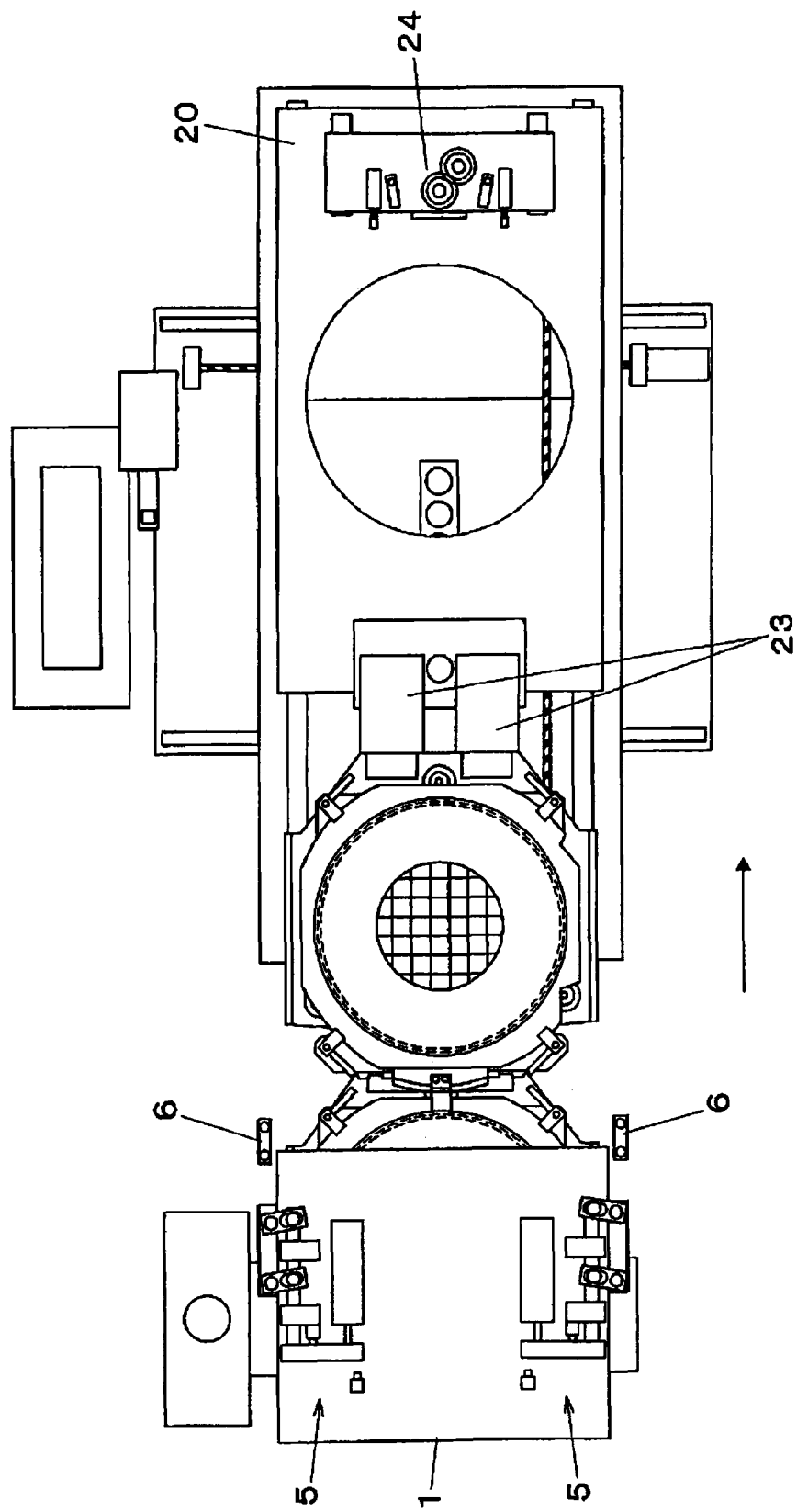
FIG. 18 is an explanatory view of an automatic exchange process of the pallet.
Figure 19:
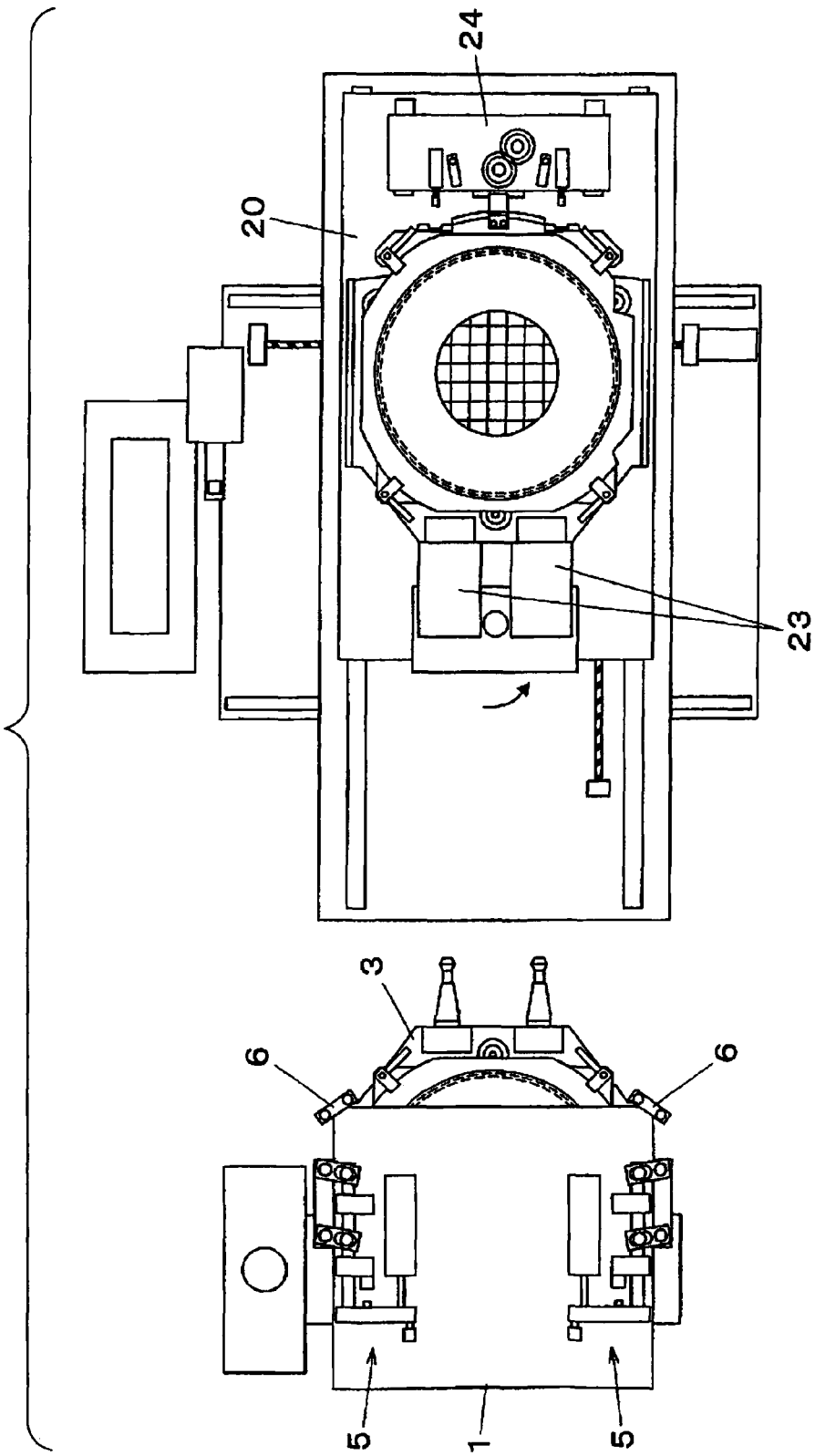
FIG. 19 is an explanatory view of an automatic exchange process of the pallet.
Figure 20:
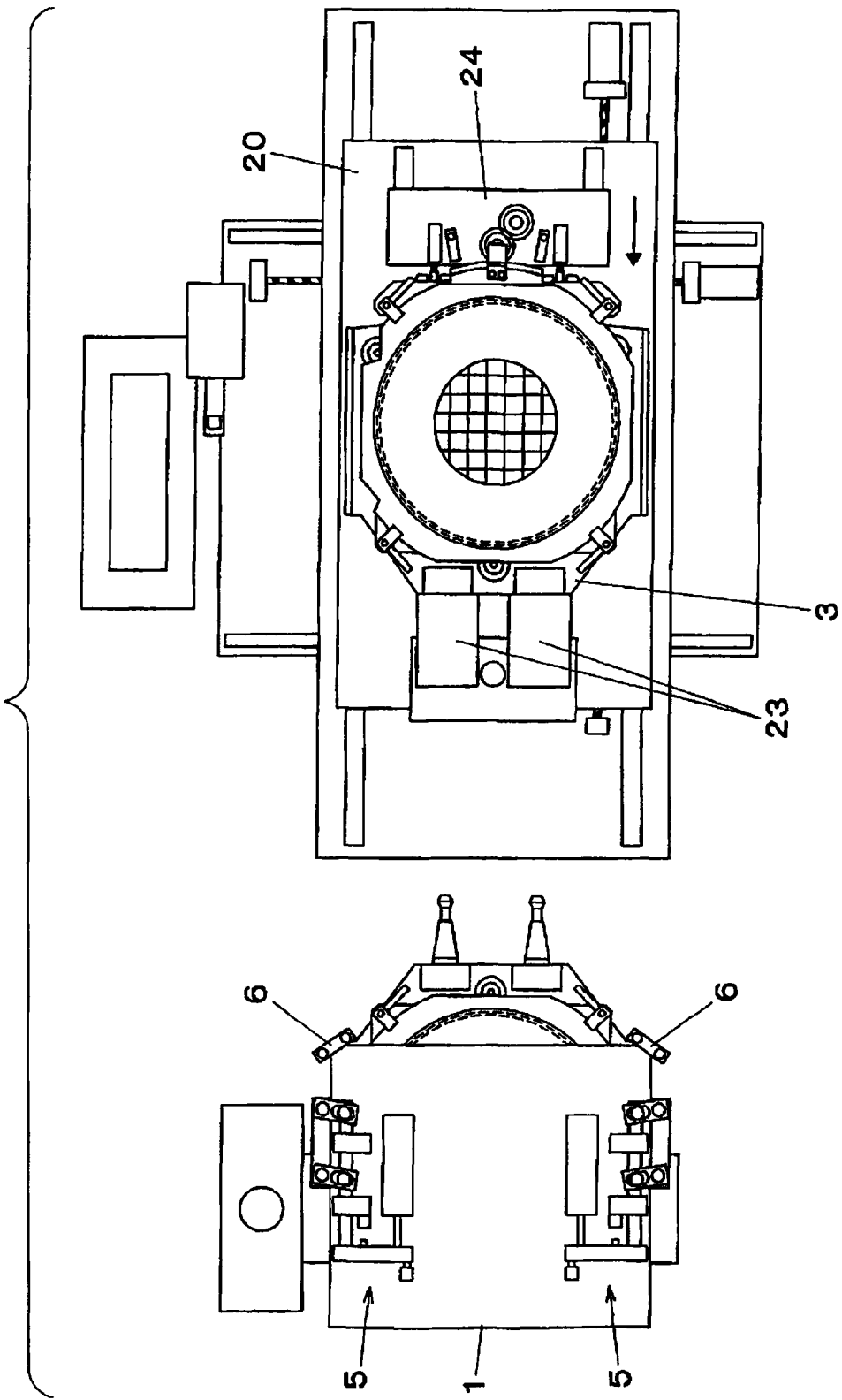
FIG. 20 is an explanatory view of an automatic exchange process of the pallet.

Now, an exemplary embodiment of the present invention will be described below by referring to the drawings. FIG. 1 is a plan view of an automatic pallet exchange device of the exemplary embodiment of the present invention. FIG. 2 is a side view of the automatic pallet exchange device of the exemplary embodiment of the present invention. FIG. 3 is an explanatory view of a pallet positioning mechanism. FIG. 4 is an explanatory view of a mechanism for fixing a pallet by a first pallet fixing part. FIG. 5 is a plan view of a wafer ring. FIG. 6 is a plan view of a pallet rotating part. FIG. 7 is a plan view of a base part of the pallet. FIG. 8 is a plan view of an entire part of the pallet. FIG. 9 is an explanatory view of a mechanism for attaching the wafer ring to the pallet rotating part. FIG. 10 is an explanatory view of a mechanism for attaching the pallet rotating part to the base of the pallet. FIG. 11 is an explanatory view of a mechanism for regulating the rotation of the pallet rotating part. FIG. 12 is an explanatory view of a mechanism for fixing the pallet by a second pallet fixing part. FIG. 13 is an explanatory view of a mechanism for fixing the pallet by the second pallet fixing part. FIG. 14 is an explanatory view of a mechanism for fixing the pallet by the second pallet fixing part. FIG. 15 is an explanatory view of a mechanism for fixing the pallet by the second pallet fixing part. FIG. 16 is an explanatory view of an automatic exchange process of the pallet. FIG. 17 is an explanatory view of an automatic exchange process of the pallet. FIG. 18 is an explanatory view of an automatic exchange process of the pallet. FIG. 19 is an explanatory view of an automatic exchange process of the pallet. FIG. 20 is an explanatory view of an automatic exchange process of the pallet.

Initially, the automatic pallet exchange device will be described. In FIGS. 1 and 2, a pallet magazine 1 includes a plurality of pallet accommodating chambers 2 divided in a vertical direction. In each of the pallet accommodating chambers 2, one pallet 3 is accommodated. Since the accommodated pallet 3 is taken out from the uppermost pallet accommodating chamber 2, the uppermost pallet accommodating chamber 2 is vacant. The pallet magazine 1 can be moved upward and downward by an elevator 4. When the pallet is taken out, the pallet accommodating chamber 2 in which the pallet 3 desired to be taken out is positioned to a prescribed height. When the taken out pallet 3 is accommodated in the pallet accommodating chamber 2, the vacant pallet accommodating chamber 2 is positioned to a prescribed height.

The pallet magazine 1 includes a pallet positioning mechanism 5 for regulating the positions of the pallets 3 respectively accommodated in the pallet magazine 1 to a transverse direction (a direction orthogonal to the direction for taking in and out the pallet 3) and a pallet running-out preventing mechanism 6 for pressing the pallet forward and backward (the direction for taking in and out the pallet 3) so that the pallet 3 is not run out from the magazine.

The pallet positioning mechanism 5 allows pawls 7 to come into contact with both side surfaces of each pallet 3 accommodated in the pallet magazine 1 to position the pallet in the transverse direction. In both sides of the pallet magazine 1, two rotating shafts 8 standing vertically are respectively arranged. To the rotating shafts 8 respectively, the pawls 7 are attached at positions of the same height as that of each pallet 3 accommodated in the pallet magazine 1. The pawls 7 are attached to the rotating shafts 8 at positions eccentric to the rotating shafts 8 and come into contact with both the surfaces of each pallet 3 by the rotation of the rotating shafts 8. In the pallet magazine 1, three side surfaces except a side surface for taking in and out the pallet are closed, however, such openings 9 are formed in both side surfaces as to allow the pawls 7 to come into contact with the pallet 3.

In an upper part of the pallet magazine 1, cylinders 10 are arranged as driving sources for rotating the rotating shafts 8. The cylinders 10 rotate the rotating shafts 8 by prescribed angles through link parts 12 by expanding and contracting piston rods 11. Under a state that the piston rods 11 are contracted, the pawls 7 come into contact with both the surfaces of the pallet 3 to regulate the movement of the pallet 3 in the transverse direction and position the pallet 3 at a prescribed position (see FIG. 3a). On the other hand, when the piston rods 11 are expanded, the pawls 7 are separated from both the surfaces of the pallet 3 to release the regulated state of the pallet 3 (see FIG. 3b). Under this state, the pallet 3 can be taken out from the pallet magazine 1 and the pallet 3 can be accommodated in the pallet magazine 1.

The pallet running-out preventing mechanism 6 allows engaging members 13 to come into contact with the end parts of each pallet 3 accommodated in the pallet magazine 1 to regulate a forward and backward movement of the pallet, fix the pallet in the magazine and prevent the pallet from running out. The engaging members 13 are vertically standing rod shaped parts and rotate on rotating shafts 14 to move to a position where the engaging members come into contact with the end parts of each pallet 3 in a front surface of the pallet magazine 1 in the side for taking in and out the pallet and a position where the engaging members retreat to both side surfaces of the pallet magazine 1 from the front surface. In a lower part of the pallet magazine 1, a cylinder mechanism 15 as a driving source is arranged for moving the engaging members 13. A linear movement of the cylinder mechanism 15 is converted into the rotation of the engaging members 13.

A pallet fixing table 20 is a place where the pallet 3 taken out from the pallet magazine 1 is fixed and is arranged in a side of the pallet magazine 1 for taking in and out the pallet. The pallet fixing table 20 can be horizontally moved by two linearly moving tables 21 and 22 and includes pallet fixing parts 23 and 24 for fixing the pallet 3. The first linearly moving table 21 moves the pallet fixing table 20 in the direction for taking in and out the pallet 3 by a ball screw mechanism 25. The second linearly moving table 22 moves the pallet fixing table 20 in the direction orthogonal to the direction for taking in and out the pallet 3 by a ball screw mechanism 26.

The first pallet fixing part 23 is provided on an upper part of the pallet fixing table 20 so as to be horizontally turned in a side near the pallet magazine 1. The first pallet fixing part 23 has two depression parts 17 into which two protrusions 16 arranged in parallel in the horizontal direction at the end part of the pallet 3 are inserted. The first pallet fixing part 23 is pivotally supported on the pallet fixing table 20 by a rotating shaft 27 and horizontally turned by a motor 28 as a driving source so that the first pallet fixing part 23 may change its direction.

The second pallet fixing part 24 is provided in the upper part of the pallet fixing table 20 in a side remote from the pallet magazine 1. The second pallet fixing part 24 fixes an opposite side of the pallet 3 to the side fixed by the first pallet fixing part 23. The pallet 3 taken out from the pallet magazine 1 is horizontally fixed at a prescribed position of the pallet fixing table 20 with forward and backward sides fixed by the first fixing part 23 and the second fixing part 24.

A pick-up device 30 and an ejector device 31 have functions for taking out electronic parts 32 from the pallet 3. The pallet 3 has a space that vertically passes through at a central part of the pallet. On an upper part of the space, the electronic parts 32 bonded to a wafer sheet 33 are provided. A position shown by a broke line in the drawing is a pick-up position of the electronic parts 32. The electronic parts 32 positioned at this position by the movement of the pallet fixing table 20 is thrust upward from a lower part by pins 31a of the ejector device 31 and adsorbed by a nozzle 34 of the pick-up device 30 from an upper part so that the electronic parts 32 is picked up from the pallet 3.

A camera 35 picks up an image of the electronic parts 32 positioned at the pick-up position. Image data of the electronic parts 32 obtained by picking up the image is used when the electronic parts 32 is mounted on a board 36. When the direction of the electronic parts 32 is inclined, the direction is corrected by rotating the nozzle 34 and a positional shift is corrected by moving a board table 37 for supporting the board 36.

Now, a mechanism will be described below, which allows the depression parts 17 of the first pallet fixing parts 23 to be engaged with the protrusions 16 of the pallet 3. In FIG. 4(a), the protrusion 16 protrudes horizontally from the end part of the pallet 3 and has a conical body shaped part (a conical body part) 40 formed whose diameter is gradually reduced toward an end part. In the end part of the conical body part 40, a part 41 is formed whose diameter is smaller than that of a thin part of a foremost side of the conical body part 40. In the end part of the small diameter part 41, a part 42 is formed whose diameter is larger than that of the small diameter part 41.

In the depression part 17 of the first pallet fixing part 23, an inner peripheral surface 43 is formed that has the same configuration as that of an outer peripheral surface of the conical body part 40. In an inner space of the inner peripheral surface 43, a large diameter side is opened to an outer part. In a more interior part of the inner peripheral surface 43, an engaging member 44 is arranged that can be moved in an inserting direction of the protrusion 16. The engaging member 44 is provided with engaging elements 45 engaged with the large diameter part 42 of the protrusion 16. The engaging member 44 moves in the inserting direction of the protrusion 16 under a state that the large diameter part 42 is engaged with the engaging elements 45 to allow the outer peripheral surface of the conical body part 40 to come into completely close contact with the inner peripheral surface 43 of the first pallet fixing part 23. The outer peripheral surface of the conical body part 40 comes into completely close contact with the inner peripheral surface 43 so that the pallet 3 is strongly fixed to the first pallet fixing part 23.

The engaging elements 45 are ball shaped members and respectively movably inserted into two holes formed in the engaging member 44. In a more interior space of the inner peripheral surface 43, a tapered part 46 is formed whose diameter is gradually reduced in the inserting direction of the protrusion 16. When the engaging member 44 is moved, the engaging elements 45 are moved inward along the tapered part 46 to be engaged with a tapered part 47 formed in the large diameter part 42 and inclined in an opposite direction to that of the tapered part 46 (see FIG. 4b).

The engaging member 44 is moved by a piston rod 48 that is expanded and contracted in the horizontal direction. When the piston rod 48 is contracted, the large diameter part 42 is engaged with the engaging elements to fix the pallet 3. When the piston rod 48 is expanded, an engagement is released to release the fixed state of the pallet 3. Further, under this state, the protrusion 16 can be inserted into the depression part 17 and the pallet 3 can be fixed by the first pallet fixing part 23.

Now, the structure of the pallet 3 will be described below. The pallet 3 includes a wafer ring 50 (see FIG. 5), a pallet base part 51 (see FIG. 6) and a pallet rotating part 52 (see FIG. 7).

In the wafer ring 50, a wafer sheet 54 having flexibility is held by an annular rigid ring frame 53. The wafer sheet 54 has an adhesive surface to which a semiconductor wafer is stuck which is divided into a plurality of electronic parts 32 as individual pieces. The wafer ring 50 is fixed on the pallet rotating part 52. The pallet rotating part 52 is mounted on the pallet base part 51 so as to freely rotate relative to the pallet base part 51.

In an end part of the pallet base part 51, the protrusions 16 are arranged. To a side opposed thereto, cut-out parts 49 are formed. The protrusions 16 are engaged with the first pallet fixing parts 23 and the cut-out parts 49 are engaged with the second pallet fixing part 24 so that the pallet base part 51 is fixed to the pallet fixing table 20.

On an upper surface of the pallet rotating part 52, a ring part 55 of a diameter smaller than that of a hollow part of the ring frame 53 is provided. In an outer side of the ring part 55, four engaging members 56 are arranged at equal intervals. A space passing through vertically is formed inside the ring part 55. The engaging member 56 includes a finger engaging part 57 and a stopper 58 and is pivotally supported on the pallet rotating part 52 by a shaft 59. The stopper 58 rotates on the shaft 59 in parallel with the pallet rotating part 52 in a part nearer to the ring part 55 than to the shaft 59. The wafer ring 50 is overlapped on the pallet rotating part 52 so that the wafer sheet 54 comes into contact with the ring part 55 and the ring frame 53 is fixed by the engaging members 56 (see FIG. 8 and FIG. 9). At this time, since the ring frame 53 is pushed down to a position a little lower than an upper end of the ring part 55, the wafer sheet 54 is expanded inside the ring frame 53. Thus, since spaces between the electronic parts 32 stuck to the wafer sheet 54 are widened, during a pick-up operation, the interference with the adjacent electronic parts 32 can be avoided.

A central part of the pallet base part 51 is a space passing through in the vertical direction. In the periphery of the space, three rollers 60 are arranged at equal intervals. In the outer periphery of the ring part 55 of the pallet rotating part 52, roller receiving parts 61 are arranged that have grooves engaged with the outer peripheries of the rollers 60 (see FIG. 10). Since the three rollers 60 are engaged with the roller receiving parts 61, the pallet rotating part 52 is mounted on the pallet base part 51 with a slight clearance. The pallet rotating part 52 is supported only by the three rollers 60 so that the pallet rotating part 52 freely rotates to the pallet base part 51.

Now, by referring to FIG. 11, a structure will be described for regulating the rotation of the pallet rotating part 52 relative to the pallet base part 51. In the pallet base part 51, an engaging member 62 is arranged that is located in the inner peripheral side of the roller receiving part 61. The engaging member 62 is pressed to the inner peripheral surface of the roller receiving part 61 by the resilient force of a compression spring 63. In the engaging member 62, a small hole 64 is formed that faces the inner periphery of the roller receiving part 61. A small protrusion 65 formed in the inner peripheral surface of the roller receiving part 61 is accommodated in the hole 64. Under this state, since the movement of the protrusion 65 is restricted by the hole 64, the pallet rotating part 52 cannot rotate relative to the pallet base part 51 (see FIG. 11a).

In an end part of the pallet base part 51, a push button 66 connected to the engaging member 62 is provided. When the push button 66 is pushed, the engaging member 62 is moved against the resilient force and separated from the inner peripheral surface of the roller receiving part 61. Thus, the pallet rotating part 52 can freely rotate relative to the pallet base part 51 (see FIG. 11b).

Now, the second pallet fixing part 24 will be described below by referring to FIGS. 12, 13 and 14.

The second pallet fixing part 24 is provided with engaging parts 70 engaged with the cut-out parts 49 provided at two positions on the pallet base part 51. The two cut-out parts 49 are provided at separate positions with the same height. The engaging parts 70 are provided at two positions with the same height respectively corresponding to the engaging parts 70.

On a lower surface of the pallet fixing part 24, sliders 71 are provided. The sliders 71 are mounted on rails 72 arranged on the upper surface of the pallet fixing table 20. The second pallet fixing part 24 linearly moves along the rails 72 by expansion and contraction of a piston rod 73. When the second pallet fixing part 24 moves toward the first pallet fixing part 23, the second pallet fixing part 24 fixes the pallet base part 51 (FIG. 12). When the second pallet fixing part 24 moves to an opposite side, the second pallet fixing part 24 releases the fixed state of the pallet base part 51 (FIG. 13).

FIG. 14 is a side view showing a state that the engaging parts 70 are engaged with the cut-out parts 49. In the cut-out part 49, a pin 74 of a circular form in section is mounted sideways. In an end of the engaging part 70, a V shaped groove 75 is formed that holds the pin 74 in upper and lower parts so that the V shaped groove 75 comes into contact with the pin 74 when the second pallet fixing part 24 moves toward the first pallet fixing part 23 (FIG. 14a). The engaging part 70 is urged to be separated from the second pallet fixing part 24 by a compression spring 76, to press each pin 74 with which the engaging part comes into contact to an innermost part of the V shaped groove 75 and to fix the pallet base part 51 horizontally.

Now, a mechanism for rotating the pallet rotating part 52 will be described below. In FIG. 7, in the pallet rotating part 52, a circular arc shaped driven gear 80 is provided. In FIG. 12, the second pallet fixing part 24 includes a driving gear 81 meshing with the driven gear 80 and a main moving gear 82 meshing with the driving gear 81. When the second pallet fixing part 24 fixes the pallet base part 51, the driving gear 81 is engaged with the driven gear 80. The main moving gear 82 is driven by a motor 83 to transmit a driving force to the driven gear 80 through the driving gear 81. A rotating angle of the pallet rotating part 52 can be adjusted by the drive and control of the motor 83.

The second pallet fixing part 24 includes a mechanism for regulating the rotating angle of the pallet rotating part 52. In the second pallet fixing part 24, a pair of photo-sensors 84 and 85 are arranged at positions between which the driving gear 81 is sandwiched to detect a light shield plate 86 (FIG. 7) attached to the pallet rotating part 52. When the light shield plate 86 moving with the rotation of the pallet rotating part 52 interferes with lights emitted from the photo-sensors 84 and 85, the rotation of the pallet rotating part 52 is stopped by the drive and control of the motor 83.

Further, the second pallet fixing part 24 includes an engagement releasing member 87 for pressing the push button 66 of the pallet base part 51. As shown in FIG. 15, the engagement releasing member 87 is arranged to firstly come into contact with the push button 66 when the second fixing part 24 moves to such a position where tooth tops of the driving gear 81 and the driven gear 80 interfere with each other. Thus, when the engagement by the engaging member 62 is released, the driving gear 81 is engaged with the driven gear 80. Thus, the pallet rotating part 52 can be prevented from suddenly rotating.

Now, an automatic exchange of the pallet will be described below. Here, processes in which the pallet 3 taken out from the pallet magazine 1 is fixed to the pallet fixing table 20 will be described below by referring to the drawings. Initially, as shown in FIG. 16, the first pallet fixing parts 23 are opposed to the protrusions 16 of the pallet 3 to be taken out. In an operation of the automatic pallet exchange device, the first pallet fixing parts 23 are horizontally turned (an arrow mark a) and the pallet fixing table 20 is horizontally moved (arrow marks b and c) to position the first pallet fixing parts 23 and the pallet fixing table 20 in the horizontal direction and the pallet magazine 1 is vertically moved to position the pallet fixing parts and the pallet fixing table in the direction of height. Further, the pallet 3 is positioned by the pallet positioning mechanism 5 so as not to be moved in the transverse direction in the pallet magazine 1.

Further, the pallet 3 is restrained from moving forward and backward by the pallet running-out preventing mechanism 6 so as not to run out from the pallet magazine 1.

Then, as shown in FIG. 17, the pallet fixing table 20 is horizontally moved to the pallet 3 to allow the first pallet fixing parts 23 to be engaged with the two protrusions 16. Then, as shown in FIG. 18, after the regulation of movement of the pallet 3 by the pallet positioning mechanism 5 and the pallet running-out preventing mechanism 6 is released, the pallet fixing table 20 is horizontally moved to take out the pallet 3 from the pallet magazine 1. At this time, the pallet 3 has one end fixed and held by the first pallet fixing parts 23 in a cantilever state.

When the pallet 3 is completely taken out from the pallet magazine 1, the pallet fixing parts 23 are horizontally turned to change the direction of the pallet 3 by 180° as shown in FIG. 19. In accordance with the change of the direction, the other end side of the pallet 3 (the side which is not fixed by the first pallet fixing parts 23) is opposed to the second fixing part 24 in a positional relation. After that, as shown in FIG. 20, the second pallet fixing part 24 moves toward the pallet 3 side and is engaged with the end part of the pallet 3 to fix the pallet 3 from the other end side. At the same time, the driving gear 80 meshes with the driven gear 80 so that the pallet rotating part 52 may be rotated. At this time, the pallet 3 is fixed on the pallet fixing table 20 under a state that both the opposed sides of the pallet 3 are supported by the first pallet fixing parts 23 and the second pallet fixing part 24.

The above-described automatic pallet exchange device has such advantages as described below. Initially, when the pallet is exchanged, a horizontally moving operation is carried out as well as a linearly moving operation, so that a linear movement distance of the pallet can be more shortened and an entire part of the device can be more simplified and compact than a usual device. Further, since the pallet can be linearly moved and turned at the same time, a time necessary for exchanging the pallets can be shortened. Further, the pallet has the plurality of protrusions and the protrusions are respectively allowed to be engaged with the depression parts of the pallet fixing parts so that the pallet is fixed at a plurality of positions. Thus, accuracy or a reproducibility of positioning is excellent. Further, the outer peripheral surface of the conical body part of the protrusion is allowed to come into close contact with the inner peripheral surface of the depression part to fix the pallet. Thus, even when an inertial force or a centrifugal force is exerted on the pallet during the movement or a turning operation of the pallet, the position of the pallet is not shifted and strongly maintained.

Further, since the pallet is moved under the cantilever state, the side that is not fixed may be occasionally suspended due to its tare weight. However, on the pallet fixing table, since the pallet is fixed with both sides supported, the pallet is horizontally held. During the movement of the pallet fixing table, since a vibration or a positional shift is effectively suppressed in the pallet fixed with both sides supported, the positioning accuracy of the electronic parts is improved.

The present invention is especially available for a multichip bonding device in which a plurality of pallets is exchanged to mount chips.

What is claimed is:

1. An automatic pallet exchange device, comprising:
   a pallet magazine accommodating a plurality of pallets respectively having a plurality of horizontally extending protrusions so as to be taken in and out in horizontal directions;
   a first pallet fixing part having a plurality of horizontally extending depression parts, wherein each of the protrusions is horizontally insertable into each of the depression parts to horizontally fix the pallet;
   a pallet fixing table, having an upper part on which the first pallet fixing part is arranged;
   a first unit horizontally moving the pallet fixing table;
   a second unit horizontally turning the first pallet fixing part;
   a pallet fixing area provided within a range of an upper surface of the pallet fixing table, the pallet to be fixed in the pallet fixing area; and
   a second pallet fixing part provided in a position on the pallet fixing table, the position outside the pallet fixing area and opposed to the first pallet fixing part,
   wherein the first pallet fixing part holds one end of the pallet by engaging each of the protrusions with each of the depression parts,
   the first unit horizontally moves the pallet fixing table with the one end of the pallet being fixed by the first pallet fixing part and takes out the pallet from the pallet magazine,
   the second unit changes a direction of the pallet taken out from the pallet magazine by 180°,
   the second pallet fixing part fixes an other end of the pallet changed by 180° by the second unit, the other end opposed to the one end of the pallet, to fix the pallet to the pallet fixing table in the pallet fixing area so as to exchange the pallets between the pallet fixing table and the pallet magazine.

2. The automatic pallet exchange device according to claim 1,
   wherein each of the protrusions has a conical body part whose diameter is gradually reduced toward an end; and
   each of the depression parts has an inner peripheral surface of a same configuration as an outer peripheral surface of the conical body part, the outer peripheral surface is allowed to come into close contact with the inner peripheral surface to fix the pallet.

3. The automatic pallet exchange device according to claim 1, wherein the pallet is horizontally turned and horizontally moved between the pallet fixing table and the pallet magazine at a same time.

4. The automatic pallet exchange device according to claim 1, further comprising a second pallet fixing part provided at a side that is opposed to the first pallet fixing part, on the pallet fixing table, wherein the second pallet fixing part fixes an other end of the pallet changed by 180° that is opposed to the one end of the pallet.

* * * * *